(12) United States Patent
Buer

(10) Patent No.: US 7,859,074 B2
(45) Date of Patent: Dec. 28, 2010

(54) SENSOR DIE STRUCTURE

(75) Inventor: Mark Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/748,080

(22) Filed: Mar. 26, 2010

(65) Prior Publication Data

US 2010/0176464 A1 Jul. 15, 2010

Related U.S. Application Data

(63) Continuation of application No. 11/159,571, filed on Jun. 21, 2005, now Pat. No. 7,719,074.

(60) Provisional application No. 60/598,685, filed on Aug. 4, 2004, provisional application No. 60/628,235, filed on Nov. 16, 2004.

(51) Int. Cl.
*H01L 31/00* (2006.01)
(52) U.S. Cl. .................. 257/444; 257/414; 257/417; 257/E29.324; 382/115; 382/124

(58) Field of Classification Search ......... 257/414–417, 257/444, E29.324; 382/115, 124
See application file for complete search history.

(56) References Cited

U.S. PATENT DOCUMENTS

| 4,577,345 A | 3/1986 | Abramov |
| 5,789,733 A | 8/1998 | Jachimowicz et al. |
| 5,940,526 A | 8/1999 | Setlak et al. |
| 2001/0025532 A1 | 10/2001 | Kramer |
| 2005/0110103 A1 | 5/2005 | Setlak |
| 2005/0213799 A1 | 9/2005 | Sawano |

*Primary Examiner*—Matthew E Warren
(74) *Attorney, Agent, or Firm*—Sterne, Kessler, Goldstein & Fox P.L.L.C.

(57) ABSTRACT

A sensor is implemented in an integrated circuit. The sensor includes one or more sensor pads that are provided at or near a surface of the integrated circuit. One or more integrated circuit components such as a sense amplifier are provided in the integrated circuit die adjacent the sensor pads. One or more other components are provided in the integrated circuit die adjacent the sensor pads.

21 Claims, 8 Drawing Sheets

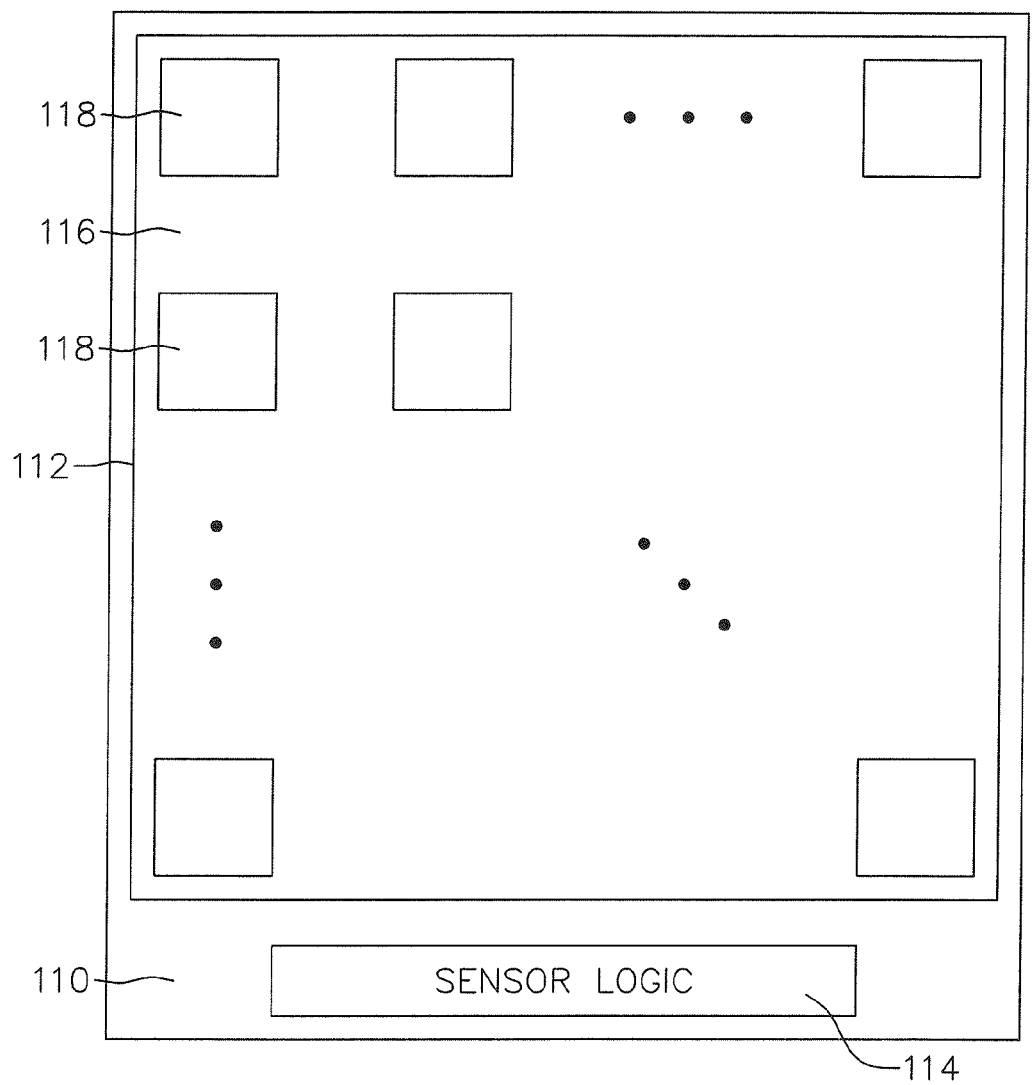
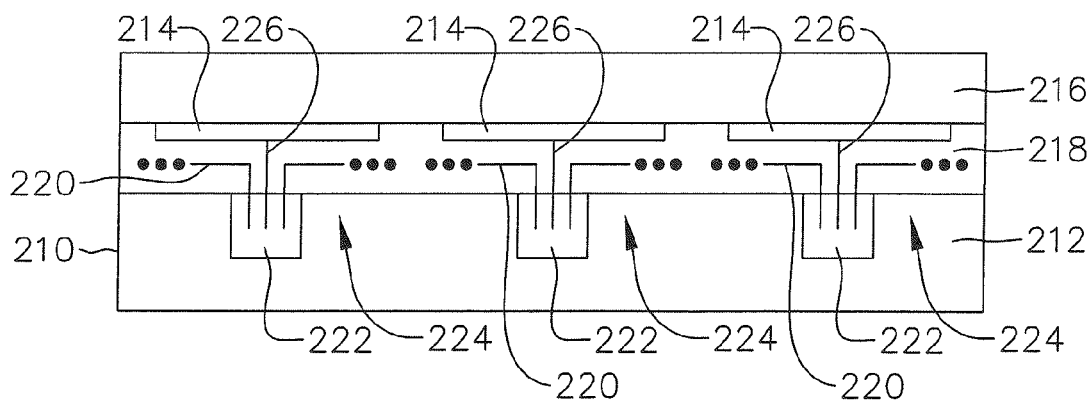

SENSOR DIE STRUCTURE

CROSS REFERENCE TO RELATED APPLICATIONS

This application is a continuation of U.S. patent application Ser. No. 11/159,571, filed on Jun. 21, 2005 (now allowed), which claims priority to U.S. Provisional Application No. 60/598,685, filed Aug. 4, 2004 and U.S. Provisional Patent Application No. 60/628,235, filed Nov. 16, 2004, all three of which are incorporated herein by reference in their entireties.

FIELD OF THE INVENTION

This application relates to sensors and, more specifically, to a die structure for a sensor.

BACKGROUND

Sensors such as biometric sensors may be constructed on an integrated circuit (i.e., chip). For example, a typical fingerprint reader constructed on an integrated circuit consists of a grid of metal plates on the top of an integrated circuit die and a sense element in the die located beneath each metal plate.

Although it may be possible to reduce the size of the sense element, in some applications, the size of the area to be sensed may not be reduced. For example, for fingerprint readers, the sense area must large enough to sense a significant portion of a person's fingerprint. Accordingly, the integrated circuit sensors such as these may be relatively large in size.

SUMMARY

The invention relates to a sensor die structure. For convenience, an embodiment of a system constructed or a method practiced according to the invention may be referred to herein simply as an "embodiment."

In one aspect of the invention a sensor is implemented in an integrated circuit. One or more sensor pads (e.g., metal plates) are provided at or near a surface of the integrated circuit. One or more integrated circuit components such as sense amplifiers are provided in the integrated circuit substrate adjacent the sensor pads. One or more other components also are provided in the integrated circuit substrate adjacent sensor pads. For example, in some embodiments all of these components may be located beneath the sensor pads. In this way, the die space underneath each sensor pad may be used efficiently.

In some embodiments integrated circuit components that have repetitive structures may be efficiently incorporated into the die areas under a grid of sensor pads. For example, data memory and programmable logic tends to have a repetitive structure. Thus, various data memory including, for example, one-time programmable ("OTP") memory, RAM and ROM may be incorporated into this die area. Also, programmable logic including, for example, field programmable gate arrays ("FPGAs") may be incorporated into this die area.

BRIEF DESCRIPTION OF THE DRAWINGS/FIGURES

These and other features, aspects and advantages of the present invention will be more fully understood when considered with respect to the following detailed description, appended claims and accompanying drawings, wherein:

FIG. 1 is a simplified diagram of a top view of a sensor implemented within an integrated circuit;

FIG. 2 is a simplified diagram of a side view of a portion of a sensor implemented within an integrated circuit;

Figure 3:
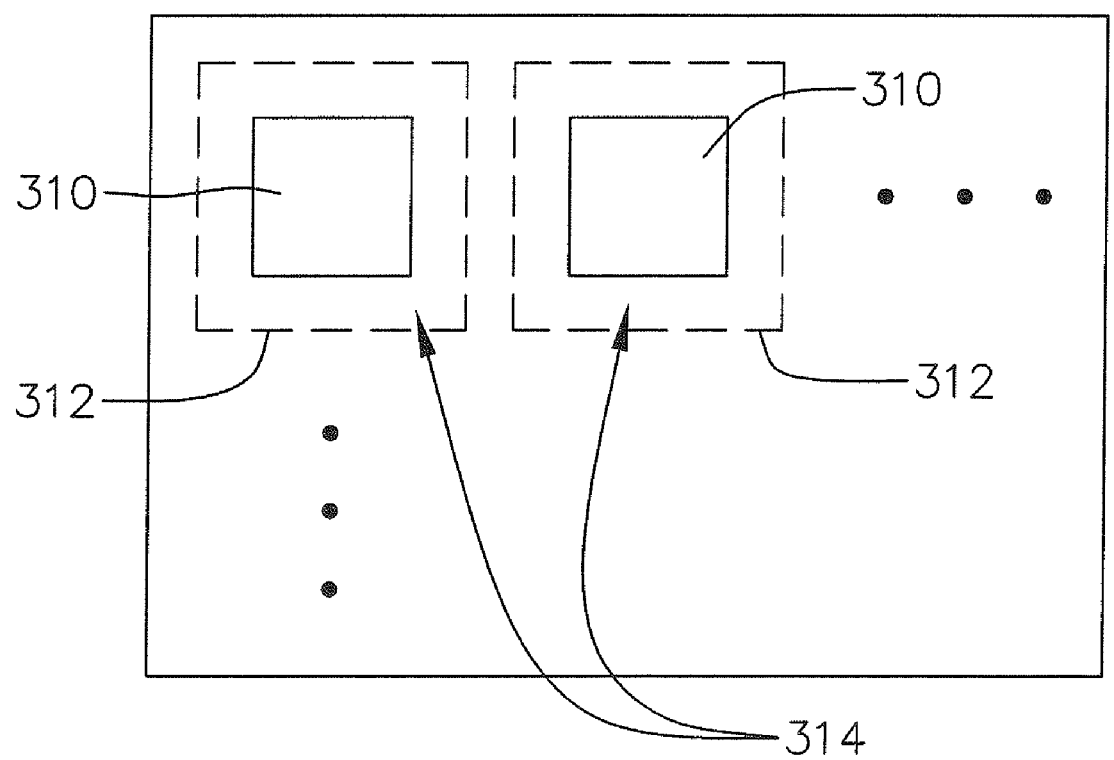
FIG. 3 is a simplified diagram of a cut-away top view of a portion of a sensor implemented within an integrated circuit.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals denote like features throughout the specification and figures.

DETAILED DESCRIPTION

The invention is described below, with reference to detailed illustrative embodiments. It will be apparent that the invention may be embodied in a wide variety of forms, some of which may be quite different from those of the disclosed embodiments. Consequently, the specific structural and functional details disclosed herein are merely representative and do not limit the scope of the invention.

FIG. 1 illustrates a top view of a sensor implemented within an integrated circuit 110. The sensor includes a grid 112 of sensor pads (or plates) 118 and sensor logic 114. The sensor pads 118 may be insulated from one another in the areas 116 between the sensor pads 118. For example, the sensor pads 118 may be spaced apart with the intervening area occupied by air or an insulating material. To reduce the complexity of FIG. 1 only a few sensor pads 118 are illustrated.

A sensor component (not shown in FIG. 1) may be located beneath each sensor pad 118. The sensor component is coupled (e.g., via an electrical lead or a capacitive circuit) to the sensor pad 118 such that interactions with the sensor pad 118 may have an affect the sensor component. For example, a sensor component may comprise a sense amplifier that amplifies a signal that results from an interaction with a sensor pad 118. Accordingly, the sensor component may comprise one or more transistors and passive components such as resistors, capacitors and/or inductors. In some embodiments the sensor component may comprise a filter.

In some embodiments each sensor pad 118 foams a plate of a capacitive circuit. By sensing the relative capacitance of and/or between the capacitive circuits associated with each sensor pad 118, the sensor may be used to generate signals indicative of conditions above the sensor pads 118. For example, sense amplifiers may be used to detect a differential between the capacitance of the capacitive circuits. Sensor logic 114 in the sensor may then be used to process the sensed signals to analyze the condition being sensed.

In some embodiments the sensor is a fingerprint reader. In such an embodiment the width of each grid may be, for example, less than 1 mm. When the tip of a finger is pressed against the sensor, ridges and valleys in the skin (i.e., the fingerprint) affect the capacitance of the capacitive circuits associated with the sensor pads 118. In this way, the sensor may be used to distinguish between different fingerprints.

FIG. 2 depicts a side view of a sensor grid 112 as shown in FIG. 1. An integrated circuit die 210 includes a substrate layer 212 within which semiconductor components (e.g., transistors, functional blocks, etc.) and passive components (e.g., resistors, capacitors, etc.) may be implemented in whole or in part. Sensor components 222 such as sense amplifiers are implemented at least in part in this substrate layer. In some embodiments sensor pads 214 are implemented in (e.g., at the top of) a metal layer 218 in the die. The metal layer 218 also provides for, in part, routing of electrical conductors (e.g., traces, power planes and ground planes) that connect to the semiconductor and passive components. For example, interconnections 220 may connect the sensor components 222 to, for example, sensor logic in the integrated circuit. In addition, interconnections 226 may connect each sensor pad 214 to a sensor component 222. A passivation layer 216 is provided on the top of the die.

When this embodiment is configured as a fingerprint reader, the sensor pads may form one plate of a capacitive circuit, the passivation layer 216 may provide dielectric for the capacitive circuit and a person's finger may form another plate of the capacitive circuit. In this case, the air gaps in the valleys between the ridges on the fingertip may affect the dielectric coefficient of the capacitive circuits. As a result, the unique pattern of the fingerprint may be ascertained by sensor logic and/or signal processing in and/or external to the integrated circuit.

FIG. 3 depicts a cut-away top view of the grid of sensor pads of FIG. 1. A sensor component 310 is located beneath each sensor pad 312 (represented by dashed lines). FIGS. 2 and 3 illustrate that conventionally, except for the sensor component (component 222 and 223 in FIGS. 2 and 3, respectively), areas (e.g., area 224 and 314 in FIGS. 2 and 3, respectively) beneath the sensor pad (e.g., sensor pad 214 and 312 in FIGS. 2 and 3, respectively) may be unused. As a result, in conventional integrated circuit sensors, a significant amount of substrate space may be, in effect, wasted.

Figure 4:
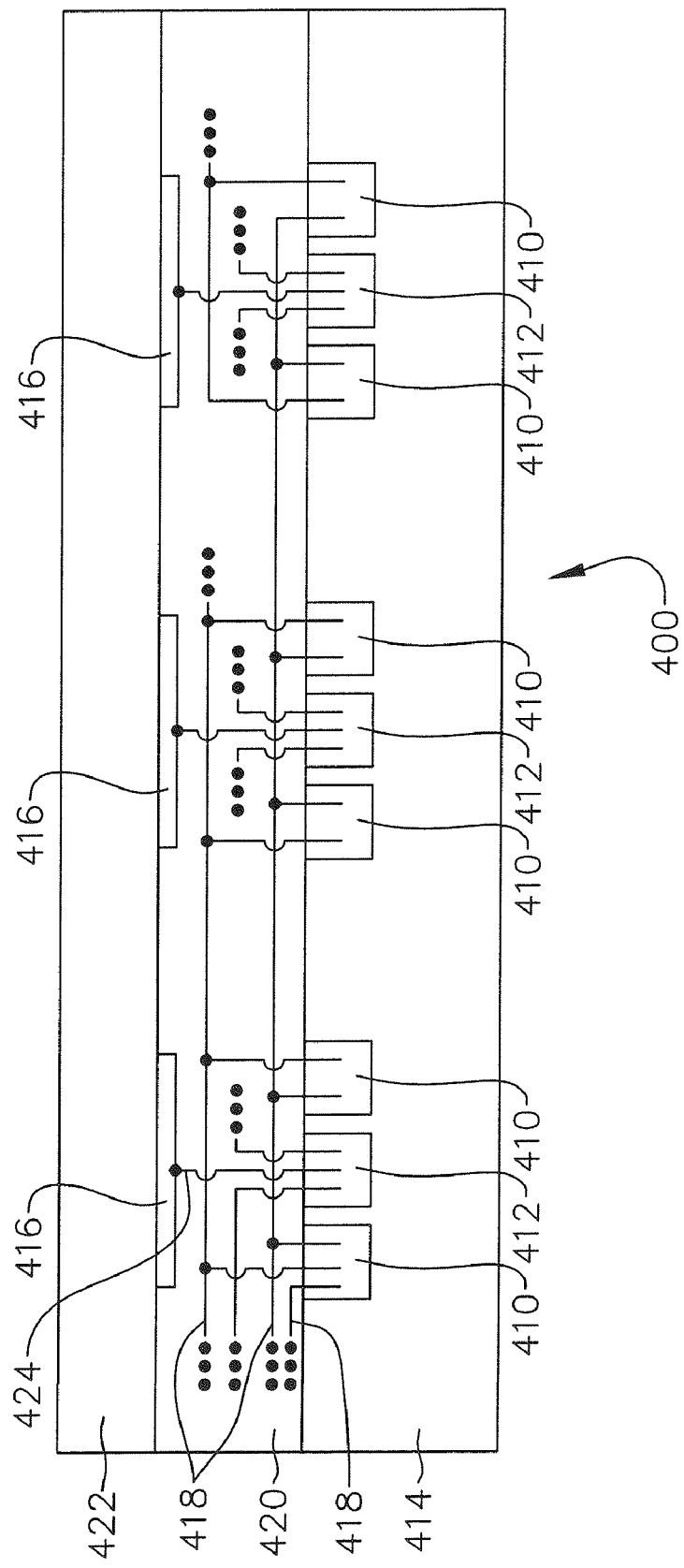
FIG. 4 is a simplified diagram of a side view of one embodiment of a sensor constructed in accordance with the invention.

FIG. 4 depicts a side view of one embodiment of a portion of a sensor 400 constructed in accordance with the invention. The sensor 400 incorporates one or more other components 410 in addition to sensor components 412 into the spaces in a substrate layer 414 under the sensor pads 416.

FIG. 4 also illustrates that the components 410 may be connected to other components in the integrated circuit die via interconnections (e.g., traces) 418 in one or more metal layers 420. In addition, the sensor pads 416 may connect to the sensor components 412 via interconnects (e.g., traces) 416. Again, in some embodiments the sensor pads 416 may be implemented in the metal layer 420 in the die. A passivation layer 422 is provided on the top of the die.

Figure 5:
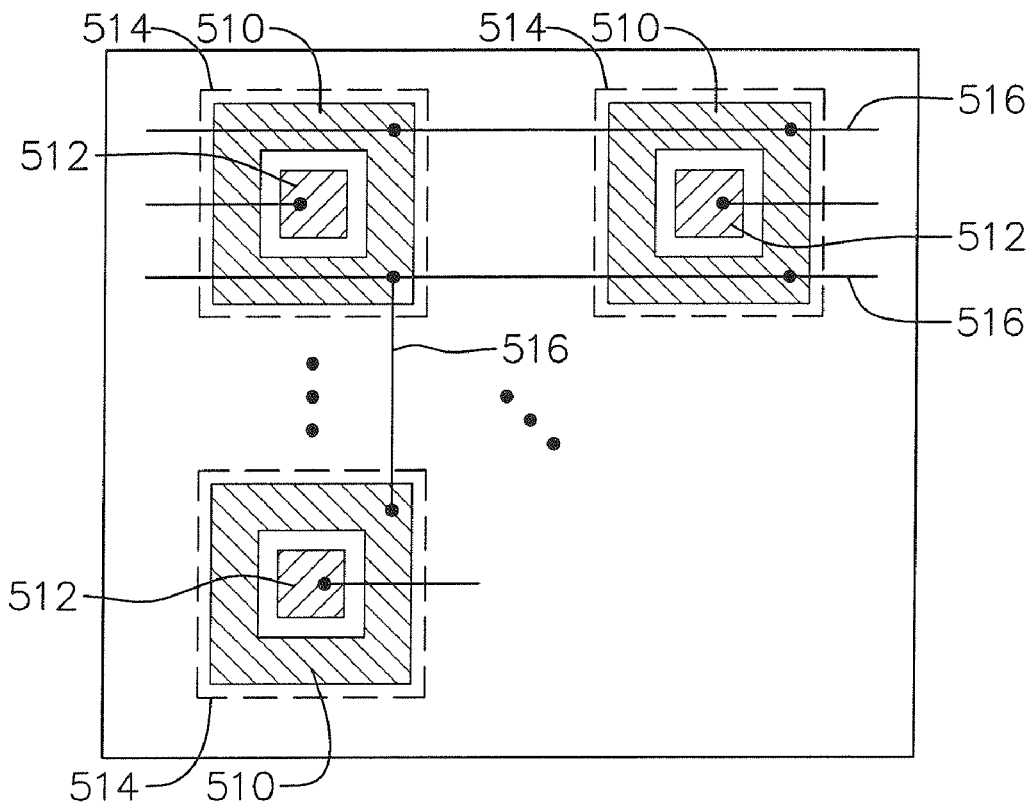
FIG. 5 is a simplified diagram of a top view of one embodiment of a sensor constructed in accordance with the invention.

FIG. 5 depicts a cut-away top view of the sensor of FIG. 4. Again, one or more other components 510 in addition to the sensor component 512 are incorporated into the space under each sensor pad 514 (represented by dashed lines). FIG. 5 also illustrates how the components 510 may connect to other components in the die via traces 516 in the metal layer(s).

The other components 410/510 in FIGS. 4/5 may comprise, for example, semiconductor components such as transistors and/or passive components such as resistors, capacitors and inductors. Typically, functional blocks of components are defined to facilitate design of the integrated circuit. Such functional blocks may include, for example, data memory, combinational logic elements and buffers.

In some embodiments the other components 410/510 are functional blocks that have repetitive structures. For example, each block may have a similar or identical layout. Accordingly, a chip designer may only need to define one of the blocks for the integrated circuit.

Also, each instance of such a block may connect to some or all of the same signals as other instances of the blocks. For example, data memory blocks may receive similar address, data and control signals. The use of such functional blocks may provide for more efficient routing of traces between the components 410/510. For example, as shown in FIG. 5 a repetitive structure of the components 410/510 may facilitate relatively simple and repetitive routing of traces connecting each component 410/510. As a result, such blocks may be efficiently incorporated into the die areas under sensor pads where the traces may need to be routed around the traces for the sensor components 412/512.

Data memory and programmable logic are examples of functional blocks that may have a repetitive structure. Thus, various data memory including, for example, one-time programmable ("OTP") memory, flash memory, RAM and ROM may be incorporated into the die under the sensor pads. This data memory may be used, for example, to store various data and/or code such as boot code. Also, programmable logic including, for example, field programmable gate arrays ("FPGAs") may be incorporated into the die under the sensor pads.

Figure 6A:
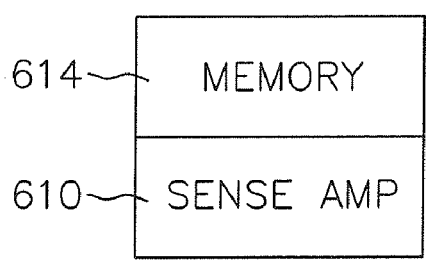
FIGS. 6A and 6B are simplified diagrams of cut-away top views of two embodiments of sensors constructed in accordance with the invention.
Figure 6B:
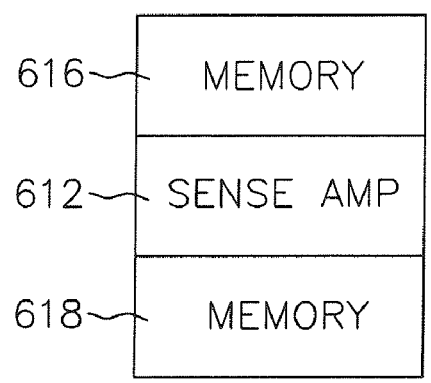

FIGS. 6A and 6B illustrate that a sensor component (e.g., a sense amplifier, etc.) 610, 612 and one or more other components (e.g., memory, etc.) 614, 616, 618 may be oriented in a variety of ways on the die. The orientation of the components 610-618 may depend, for example, on the physical and/or performance characteristics of the sensor component 610, 612, the characteristics of the other components 614, 616, 618 and/or preferred placement for ease of trace routing.

In some embodiments, a specific implementation of the sensor (e.g., sense amplifier 610) and the other component (e.g., memory 614) may be defined as a tile functional block for the integrated circuit. During the chip design and/or layout process, the tile may thus be replicated as needed to define a sensor and also provide other components (e.g., data memory) for the integrated circuit. For example, a tile may be defined under each of the sensor pads.

Figure 7:
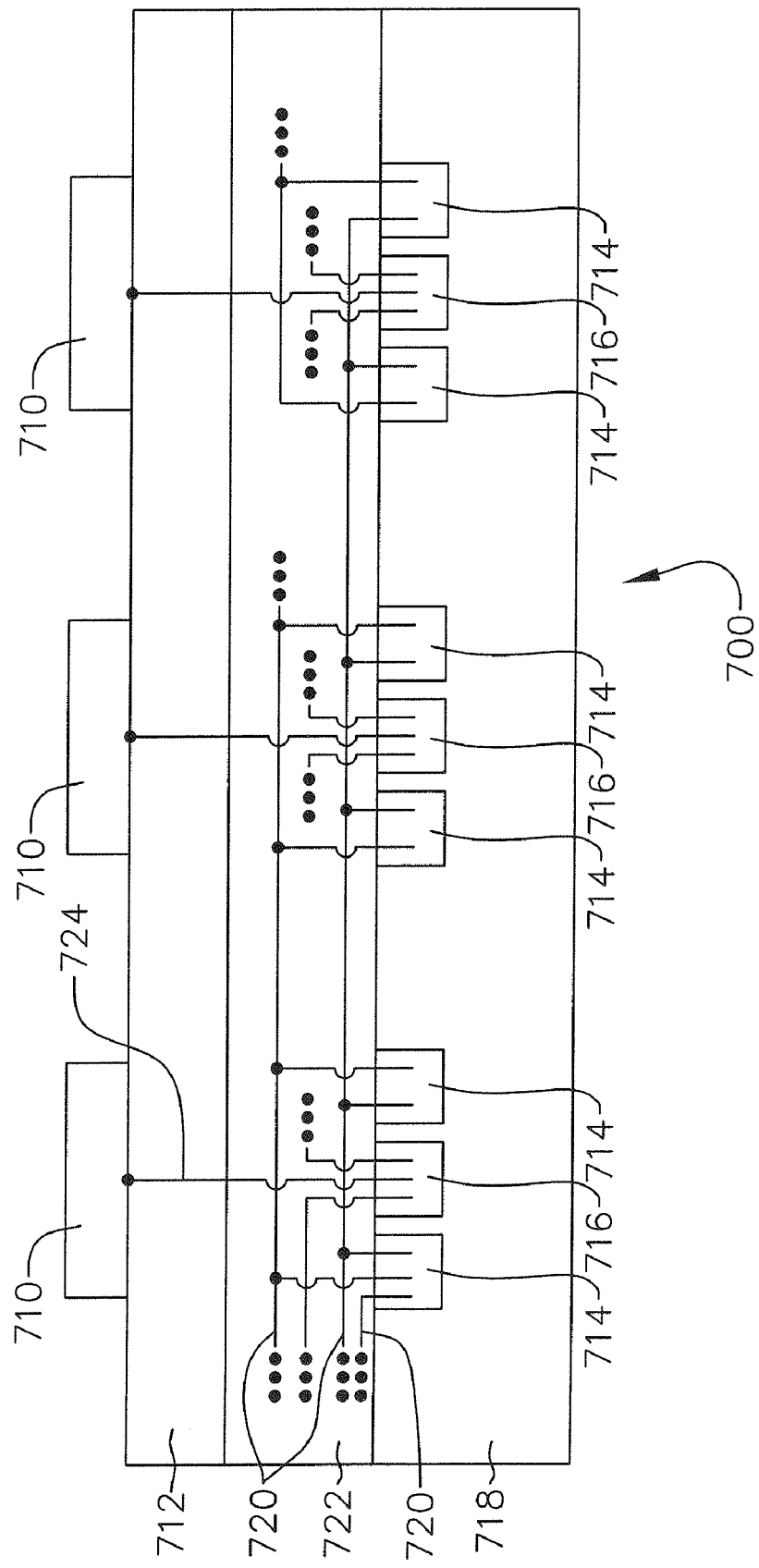
FIG. 7 is a simplified diagram of a side view of one embodiment of a sensor constructed in accordance with the invention.

FIG. 7 depicts a side view of one embodiment of a portion of a sensor 700 constructed in accordance with the invention. Here, the sensor pads 710 are placed on top of the passivation of the die 712. As discussed above, the sensor 700 incorporates one or more other components 714 in addition to the sensor component 716 into the space in the substrate layer 718 under each sensor pad 710. The components 714 and 716 may be connected to other components in the integrated circuit die via traces (e.g., traces 720 and 724) in one or more metal layers 722.

Figure 8:
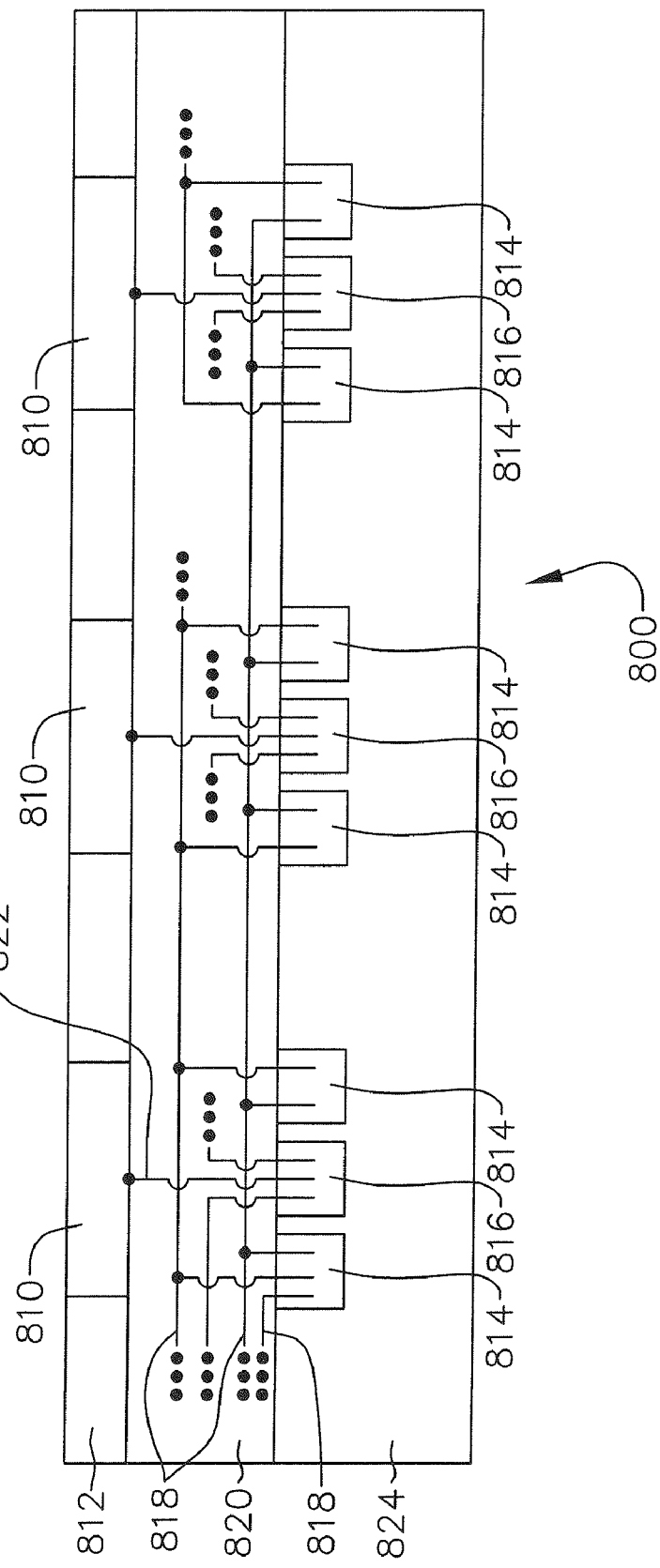
FIG. 8 is a simplified diagram of a side view of one embodiment of a sensor constructed in accordance with the invention.

FIG. 8 depicts a side view of one embodiment of a portion of a sensor 800 constructed in accordance with the invention. The sensor 800 senses light and may be incorporated, for example, into a camera (not shown). The integrated circuit die includes a grid of elements 810 constructed of light sensitive material. Typically, the light sensitive material is added to the die during a later stage of the fabrication process. That is, a layer 812 including light sensitive material may be integrated with the die after the die is initially formed.

The sensor 800 incorporates one or more other components 814 into space in a substrate layer 824 under each element 810. In some embodiments the sensor may include sensor components 816 in the substrate 824. In some embodiments active sensing components may be integrated into the light sensitive layer 812. The above components may be connected to other components in the integrated circuit die via traces (e.g., traces 818 and 822) in one or more metal layers 820.

Figure 9:
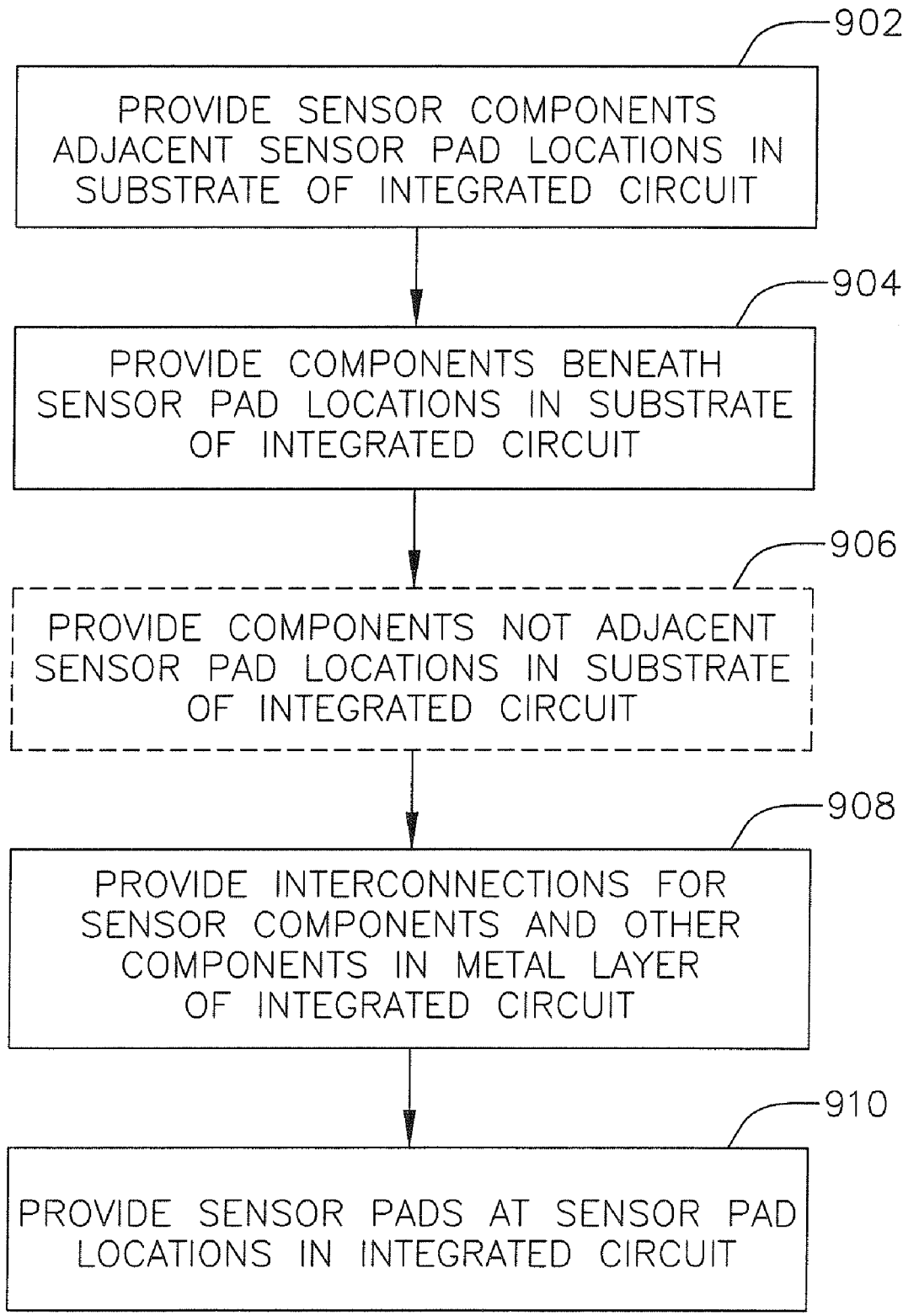
FIG. 9 is a flow chart of one embodiment of operations that may be performed in accordance with the invention.

Referring now to FIG. 9, one embodiment of operations that may be performed to provide a sensor in accordance with the invention will be discussed. The process of FIG. 9 commences with a step of the integrated circuit development and/or manufacturing process involving providing (e.g., defining or implementing) components in the substrate of the integrated circuit.

As represented by block 902, sensor components are implemented within the substrate of the integrated circuit. To reduce the length of the interconnections between the sensor components and the sensor pads, the sensor components may implemented at locations that are adjacent to the locations where the sensor pads are or will be implemented. For example, as illustrated herein a sensor component may be located within the die such that when a sensor pad is formed the sensor component lies beneath the sensor pad. It should be appreciated that the term "beneath" may equate to the term "above" if the sensor pads are defined as being on the bottom of the die (e.g., the die is turned upside down).

In some embodiments a sensor component (e.g., multiple sense amplifiers) may connect to or be coupled with more than one sensor pad. In this case, the sensor component may be implemented at a position other than immediately below a sensor pad to which it is connected. For example, a given sensor component may be adjacent to, but not underneath a sensor pad to which it is connected.

As represented by block 904, other components are implemented within the substrate of the integrated circuit. These components are implemented at locations in the die that are beneath the locations where the sensor pads are or will be implemented. The components may include, for example, components that have repetitive structures as discussed herein (e.g., data memories).

As represented by dashed block 906, other optional components may be implemented within the substrate of the integrated circuit. These components may be implemented at locations in the die that are not adjacent the locations where the sensor pads are or will be implemented. These other components may include, for example, components that connect to the components located underneath the sensor pads.

As represented by block 908, interconnections are provided in the metal layer(s) of the integrated circuit. For example, interconnections may be provided between the sensor components and the sensor pads. Interconnections may be provided between the sensor components and other components (e.g., sensor logic) in the integrated circuit. Interconnections may be provided between the components beneath the sensor pads and other components (e.g., state machine or processor) in the integrated circuit.

As represented by block 910, the sensor pads are implemented in the integrated circuit. For example, as discussed above the sensor pads may be formed in a metal layer of the integrated circuit. The integrated circuit may then be completed using conventional techniques.

A sensor constructed in accordance with the invention may be efficiently incorporated into an integrated circuit that includes other processing functionality. For example, some or all of the other processing functionality may be implemented in the otherwise unused areas of the substrate beneath the sensor pads.

Figure 10:
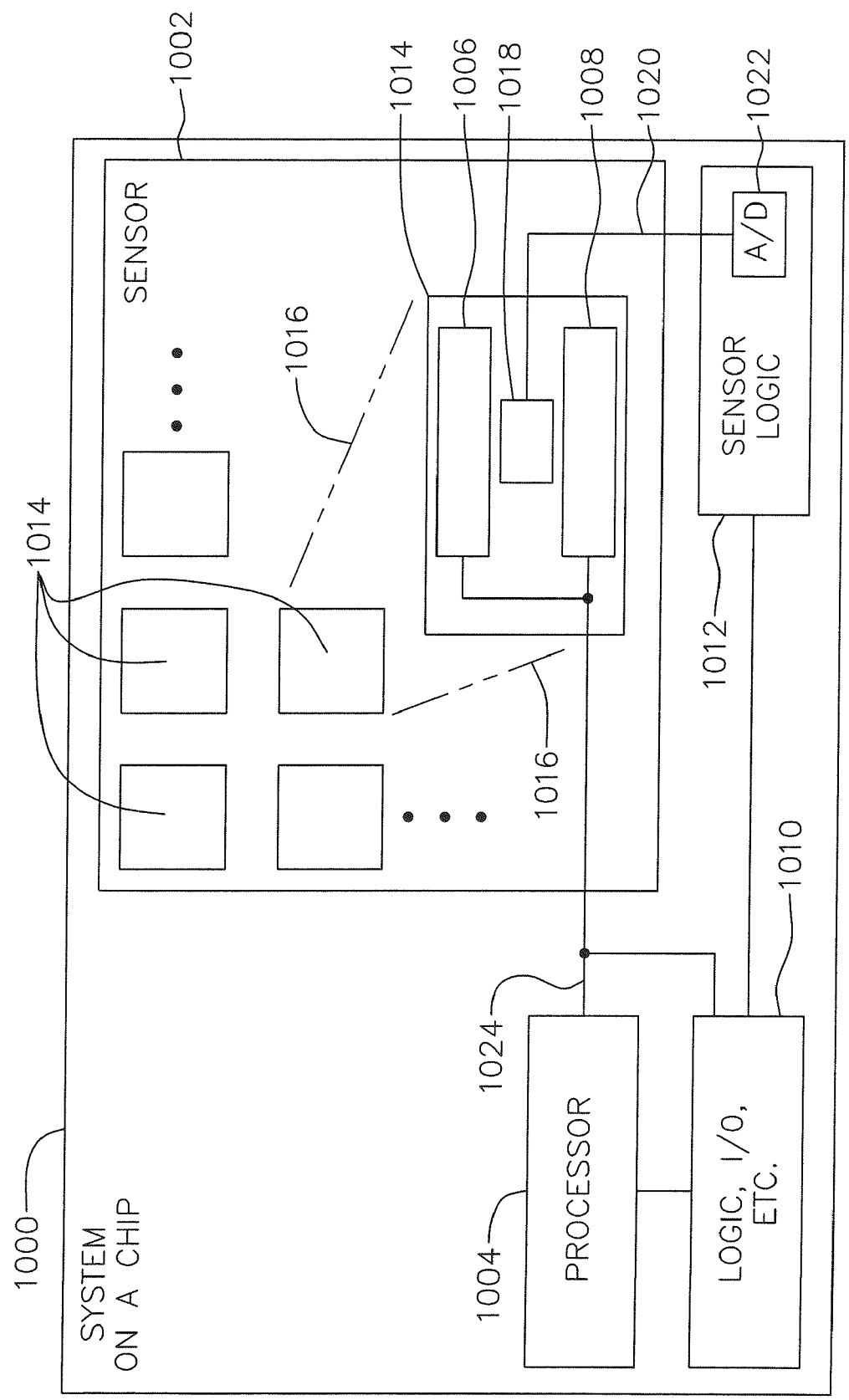
FIG. 10 is a simplified diagram of one embodiment of an integrated circuit incorporating a sensor constructed in accordance with the invention.

FIG. 10 illustrates one embodiment of an integrated circuit 1000 that incorporates one embodiment of a sensor constructed in accordance with the invention. In FIG. 10 the integrated circuit comprises a system on a chip. For example, the system may include a processor 1004, memory components (e.g., components 1006 and 1008) and various other components 1010 such as I/O, logic, busses, registers, buffers, etc. In addition, the integrated circuit 1000 includes a sensor 1002 and associated sensor logic 1012, for example, as discussed herein.

The sensor 1002 includes a grid of sensor pads 1014. For convenience only a few of the sensor pads 1014 are shown in FIG. 10. As represented by the dashed lines 1016 the structure underneath one the sensor pads 1014 is magnified in size to better illustrate components and associated connections that are located beneath the sensor pad 1014.

In some embodiments a sense amplifier 1018 is located beneath each sensor pad 1014. The sense amplifier 1018 is coupled to (coupling not shown in FIG. 10) to the sensor pad 1014. In addition, an interconnection 1020 may connect the sense amplifier 1018 to, for example, the sensor logic 1012. In some embodiments the sensor logic 1012 may include analog-to-digital (A/D) conversion circuitry 1022. This may be used, for example, to provide the sensed signals to digital logic (e.g., logic) 1010 and/or the processor 1004 for processing.

Other components 1006 and 1008 may be located beneath the sensor pads 1014 and connect to, for example, the processor 1004 and/or the logic 1010 via interconnection(s) 1024. As discussed herein the components 1006 and 1008 may comprise ROM, RAM, programmable logic, etc. In some embodiments the components 1006 and 1008 and the sense amplifier 1018 may be defined as a tile. In this way, the structure under each sensor pad 1014 may be efficiently replicated beneath some or all of the sensor pads 1014.

The teaching of the invention may be used in a variety of applications, may be incorporated into a various structures and may include a variety of components. For example, a variety of components may be implemented under the sensor pads. The above techniques may be used in various sensors including, for example, biometric sensors. Examples of biometric sensors include fingerprint readers. Also, the integrated circuit and sensor pads may take various forms. For example, the integrated circuit may comprise CMOS or other technologies. The sensor pads may be constructed of metal or/or other materials. Moreover, characteristics other than capacitance may be sensed using a sensor constructed according to the teachings herein.

Different embodiments of the invention may be implemented in a variety of ways, using a variety of structures and processes. For example, the components and functions described herein may be connected/coupled in many different ways. The manner in which this is done may depend, in part, on the particular application.

The signals/connections discussed herein may take several forms. For example, a signal/connection may comprise more than one signal/connection. A signal may consist of a series of signals. Also, a differential signal comprises two complementary signals or some other combination of signals. In addition, a group of signals/connections may be collectively referred to herein as a signal/connection.

The components and functions described herein may be connected/coupled directly or indirectly. Thus, in some embodiments there may or may not be intervening devices (e.g., buffers) between connected/coupled components.

It should be appreciated that the various components and features described herein may be incorporated in a system independently of the other components and features. For example, a system incorporating the teachings herein may include various combinations of these components and features. Thus, not all of the components and features described herein may be employed in every such system.

In summary, the invention described herein generally relates to an improved sensor die structure. While certain exemplary embodiments have been described above in detail and shown in the accompanying drawings, it is to be understood that such embodiments are merely illustrative of and not restrictive of the broad invention. In particular, it should be recognized that the teachings of the invention apply to a wide variety of systems and processes. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. An integrated circuit, comprising:
   a plurality of sensor pads in at least one metal layer of the integrated circuit; and
   a plurality of tile functional blocks, in a substrate layer of the integrated circuit, formed by a tile functional block replicated directly beneath each of the plurality of sensor pads,
   wherein each of the plurality of tile functional blocks includes a sensor component and an other component,
   wherein the other component of each of the plurality of tile functional blocks foams a portion of at least one of a data memory and a programmable logic array.

2. The integrated circuit of claim 1, wherein the sensor component is a filter.

3. The integrated circuit of claim 1, wherein the sensor component is a sense amplifier.

4. The integrated circuit of claim 3, wherein the sensor component is coupled at an input to one of the plurality of sensor pads.

5. The integrated circuit of claim 4, wherein the sensor component is coupled at an output to sensor logic that includes an analog-to-digital converter.

6. The integrated circuit of claim 1, wherein the other component of each of the plurality of tile functional blocks forms a portion of a boot ROM.

7. The integrated circuit of claim 1, wherein the other component of each of the plurality of tile functional blocks forms a portion of a one-time-programmable memory.

8. The integrated circuit of claim 1, wherein the other component of each of the plurality of tile functional blocks forms a portion of a RAM.

9. The integrated circuit of claim 1, wherein the sensor pads comprise metal plates.

10. The integrated circuit of claim 1, wherein the integrated circuit comprises a biometric sensor.

11. The integrated circuit of claim 10, wherein the integrated circuit is configured to be implemented in a fingerprint reader.

12. A fingerprint reader, comprising:
    a processor; and
    a biometric sensor, comprising:
       a plurality of sensor pads in at least one metal layer of an integrated circuit; and
       a plurality of tile functional blocks, in a substrate layer of the integrated circuit, formed by a tile functional block replicated directly beneath each of the plurality of sensor pads,
       wherein each of the plurality of tile functional blocks includes a sensor component and an other component,
       wherein the other component of each of the plurality of tile functional blocks forms a portion of at least one of a data memory and a programmable logic array.

13. The integrated circuit of claim 12, wherein the sensor component is a filter.

14. The integrated circuit of claim 12, wherein the sensor component is a sense amplifier.

15. The integrated circuit of claim 14, wherein the sensor component is coupled at an input to one of the plurality of sensor pads.

16. The integrated circuit of claim 15, wherein the sensor component is coupled at an output to sensor logic that includes an analog-to-digital converter.

17. The integrated circuit of claim 12, wherein the other component of each of the plurality of tile functional blocks forms a portion of a boot ROM.

18. The integrated circuit of claim 12, wherein the other component of each of the plurality of tile functional blocks forms a portion of a one-time-programmable memory.

19. The integrated circuit of claim 12, wherein the other component of each of the plurality of tile functional blocks forms a portion of a RAM.

20. The integrated circuit of claim 12, wherein the sensor pads comprise metal plates.

21. An integrated circuit, comprising:
    a plurality of sensor pads in at least one metal layer of the integrated circuit; and
    a plurality of tile functional blocks, in a substrate layer of the integrated circuit, formed by a tile functional block replicated directly beneath each of the plurality of sensor pads,
    wherein each of the plurality of tile functional blocks includes a sensor component and an other component,
    wherein each other component of the plurality of tile functional blocks together forms at least one of a data memory and a programmable logic array.

* * * * *

UNITED STATES PATENT AND TRADEMARK OFFICE
CERTIFICATE OF CORRECTION

| | | |
|---|---|---|
| PATENT NO. | : 7,859,074 B2 | |
| APPLICATION NO. | : 12/748080 | |
| DATED | : December 28, 2010 | |
| INVENTOR(S) | : Mark Buer | |

It is certified that error appears in the above-identified patent and that said Letters Patent is hereby corrected as shown below:

Column 7, Line 38, "foams" should be replaced with -- forms --

Signed and Sealed this
Nineteenth Day of April, 2011

David J. Kappos
*Director of the United States Patent and Trademark Office*